United States Patent
Nakashoji et al.

(10) Patent No.: US 9,683,734 B2
(45) Date of Patent: Jun. 20, 2017

(54) HEAT RECOVERY AND UTILIZATION SYSTEM

(75) Inventors: Hiroshi Nakashoji, Tokyo (JP); Tatsuto Nagayasu, Tokyo (JP)

(73) Assignee: MITSUBISHI HITACHI POWERS SYSTEMS, LTD., Yokohama (JP)

(*) Notice: Subject to any disclaimer, the term of this patent is extended or adjusted under 35 U.S.C. 154(b) by 0 days.

(21) Appl. No.: 13/989,680

(22) PCT Filed: Mar. 4, 2011

(86) PCT No.: PCT/JP2011/055020
§ 371 (c)(1),
(2), (4) Date: May 24, 2013

(87) PCT Pub. No.: WO2012/090517
PCT Pub. Date: Jul. 5, 2012

(65) Prior Publication Data
US 2013/0247845 A1    Sep. 26, 2013

(30) Foreign Application Priority Data

Dec. 27, 2010   (JP) .................................. 2010-290057

(51) Int. Cl.
*F22B 37/02* (2006.01)
*F01K 3/00* (2006.01)
(Continued)

(52) U.S. Cl.
CPC .............. *F22B 37/02* (2013.01); *F01K 3/004* (2013.01); *F01K 13/02* (2013.01); *F23J 15/06* (2013.01);
(Continued)

(58) Field of Classification Search
CPC .. F22B 37/02; F23J 15/08; F23J 15/06; F01K 3/004; F01K 13/002
(Continued)

(56) References Cited

U.S. PATENT DOCUMENTS 3,850,148 A * 11/1974 Laubli ................... F22B 35/101
                                            122/406.4
3,863,708 A *  2/1975 Grimes ......................... 165/279
(Continued)

FOREIGN PATENT DOCUMENTS

CN        1112524 A      11/1995
CN      101124449 A       2/2008
(Continued)

OTHER PUBLICATIONS

Kenzo et al., JP 2010151432 machine translation, Jul. 8, 2010, (18 pages).*

(Continued)

*Primary Examiner* — Alissa Tompkins
*Assistant Examiner* — Benjamin W Johnson
(74) *Attorney, Agent, or Firm* — Westerman, Hattori, Daniels & Adrian, LLP

(57) ABSTRACT

This invention provides a heat recovery and utilization system for efficiently utilizing heat recovered from boiler exhaust gas with a heat recovery unit without any complicated equipment or high operation costs. The heat recovery and utilization system includes: a boiler for electricity generation; a heat recovery unit for recovering heat from exhaust gas of the boiler; a heat exchanger for using heat recovered with the heat recovery unit as heat source for equipment other than for electricity generation; a heat accumulator for accumulating heat source for the equipment other than for electricity generation; and a heat medium circulation line in which heat medium circulates between the heat recovery unit and the heat exchanger to exchange the heat recovered with the heat recovery unit with the heat exchanger. Upon startup of the system, the heat exchanger preheats the heat recovery unit with heat source accumulated in the heat accumulator.

8 Claims, 2 Drawing Sheets

(51) Int. Cl.
  *F01K 13/02* (2006.01)
  *F23J 15/08* (2006.01)
  *F23J 15/06* (2006.01)
(52) U.S. Cl.
  CPC ............ *F23J 15/08* (2013.01); *F23J 2215/20* (2013.01); *Y02E 20/12* (2013.01); *Y02E 20/14* (2013.01); *Y02E 20/363* (2013.01)
(58) Field of Classification Search
  USPC ............. 122/1 C, 7 R, 6 R, 1 R; 165/104.14, 165/104.19
  See application file for complete search history.

(56) References Cited

U.S. PATENT DOCUMENTS

| | | | | |
|---|---|---|---|---|
| 3,974,642 | A | * | 8/1976 | Pacault .................. F01K 23/10 126/400 |
| 2004/0191146 | A1 | * | 9/2004 | Shinohara et al. ....... 423/240 R |
| 2006/0099902 | A1 | * | 5/2006 | Kikkawa et al. ................. 454/3 |
| 2010/0178624 | A1 | * | 7/2010 | Srinivasachar ............... 431/253 |
| 2010/0180807 | A1 | * | 7/2010 | Magaldi et al. ............. 110/346 |

FOREIGN PATENT DOCUMENTS

| | | |
|---|---|---|
| CN | 101813431 A | 8/2010 |
| EP | 1816397 A1 | 8/2007 |
| JP | 63-255507 A | 10/1988 |
| JP | 8-23290 B2 | 3/1996 |
| JP | 2001-239129 A | 9/2001 |
| JP | 2002-318006 A | 10/2002 |
| JP | 2005-036747 A | 2/2005 |
| JP | 2006-308269 A | 11/2006 |
| JP | 2010-151432 A | 7/2010 |
| JP | 4725985 B2 | 7/2011 |
| JP | 4959156 B2 | 6/2012 |

OTHER PUBLICATIONS

International Search Report for PCT/JP2011/055020, mailing date of Apr. 19, 2011.
Translation of the International Preliminary Report on Patentability (PCT/IB/338) (1 page), (PCT/IB/373) (1 page) of International Application No. PCT/JP2011/055020 mailed Jul. 11, 2013 (Form PCT/ISA/237) (5 pages).
Korean Notice of Allowance dated Sep. 29, 2014, issued in corresponding Korean Application No. 10-2013-7016130; Concise Explanation of Relevance. (3 Pages).
Japanese Notice of Allowance dated Sep. 12, 2014, issued in corresponding Japanese Patent Application No. 2010-290057 with English translation (6 pages).
Chinese Office Action dated Oct. 10, 2014, issued in corresponding Chinese Application No. 201180058447.9; w/ English Translation. (11 pages).
Notice of Allowance dated May 27, 2015, issued in corresponding Chinese Patent Application No. 201180058447.9 with English translation (4 pages).

* cited by examiner

HEAT RECOVERY AND UTILIZATION SYSTEM

TECHNICAL FIELD

The present invention relates to a heat recovery and utilization system for recovery of heat from boiler exhaust gas from a power plant.

BACKGROUND ART

Japanese Patent Application Publication No. 2001-239129 and Japanese Patent Application Publication No. 2006-308269 have disclosed provision of a heat recovery unit for recovery of heat from boiler exhaust gas upstream of desulfurization equipment or a dust collector in a boiler exhaust gas treatment line. Japanese Patent Application Publication No. 2001-239129 describes improvement of thermal efficiency of a boiler by heating boiler supply water with heat recovered with this heat recovery unit. Furthermore, Japanese Patent Application Publication No. 2006-308269 describes supply of water to a boiler after heating condensate in a steam turbine with heat recovered with the heat recovery unit and supply of air preheated with heat recovered with the heat recovery apparatus to a boiler.

PRIOR ART LITERATURE

Patent Literature

Patent Literature 1: Japanese Patent Application Publication No. 2001-239129
Patent Literature 2: Japanese Patent Application Publication No. 2006-308269

SUMMARY OF THE INVENTION

Problem to be Solved by Invention

As a utilization method of heat recovered from boiler exhaust gas with the heat recovery unit, as described above, a method of heating boiler supply water or preheating air has been known and although this has improved thermal efficiency of an entire power plant, further improvement of thermal efficiency has been demanded.

When a heat recovery unit is provided as described above, it is necessary to warm up the heat recovery unit at the time of startup of boiler exhaust gas treatment line. The warm-up requires utilization of steam from a different boiler from a boiler of the treatment line and additional equipment such as a heat exchanger, a drain collector, and therefore accompanies a problem that construction cost and operation cost are incurred. In addition, after the treatment line is stopped, application destination of the heat recovered from the boiler exhaust gas disappears, so that efficient utilization of the recovered heat is disabled.

Accordingly, in view of the above-stated problems, an object of the present invention is to provide a heat recovery and utilization system capable of efficient utilization of heat recovered from boiler exhaust gas with a heat recovery unit without any complicated equipment or high operation cost.

Means for Solving the Problem

To achieve the above-described object, the present invention provides a heat recovery and utilization system including: a boiler for electricity generation; a heat recovery unit for recovering heat from exhaust gas of the boiler; a heat exchanger for using heat recovered with the heat recovery unit as a heat source for equipment other than equipment for electricity generation; and a heat accumulator for accumulating a heat source for the equipment other than for electricity generation, wherein the heat exchanger preheats the heat recovery unit with the heat accumulated in the heat accumulator.

Preferably, the equipment other than for electricity generation is a local area heat supply facility and in this case, supply water to the local area heat supply facility is heated with heat recovered by the heat recovery unit. Preferably, the equipment other than for electricity generation is biomass drying equipment and heat medium in the biomass drying equipment is heated with heat recovered by the heat recovery unit. The equipment other than for electricity generation may be provided together with both the local area heat supply facility and the biomass drying equipment.

Preferably, the heat recovery and utilization system of the present invention includes a heat medium circulation line in which heat medium circulates between the heat recovery unit and the heat exchanger to exchange the heat recovered by the heat recovery unit with the heat exchanger. Preferably, the heat recovery and utilization system of the present invention further includes a control unit for controlling an amount of heat recovered by the heat recovery unit, which is used as heat source for the equipment other than for electricity generation, based on temperature of boiler exhaust gas after heat recovery by the heat recovery unit.

Advantageous Effects of Invention

According to the present invention, by providing the heat exchanger which uses heat recovered by the heat recovery unit for heat source for other equipment than for electricity generation, for example, a heat source for supply water to a local area heat supply facility or heat source for biomass drying equipment, the heat recovered by the heat recovery unit can be used efficiently without any limitation of a conventional power plant equipment. A heat accumulator which accumulates a heat source for equipment other than for electricity generation is used and the heat exchanger preheats the heat recovery unit using the heat source accumulated in the heat accumulator. As a result, the heat recovery unit can be preheated without using steam as conventionally, and furthermore, it is not necessary to provide such equipment as the heat exchanger and the drain collector for preheating the heat recovery unit with steam. Accordingly, the present invention provides a heat recovery and utilization system capable of efficiently utilizing heat recovered by the heat recovery unit from boiler exhaust gas without any complicated equipment or high operation cost.

EMBODIMENTS FOR CARRYING OUT THE INVENTION

Hereinafter, an embodiment of the heat recovery and utilization system of the present invention will be described with reference to the accompanying drawings. The present invention is not limited to this embodiment.

Figure 1:
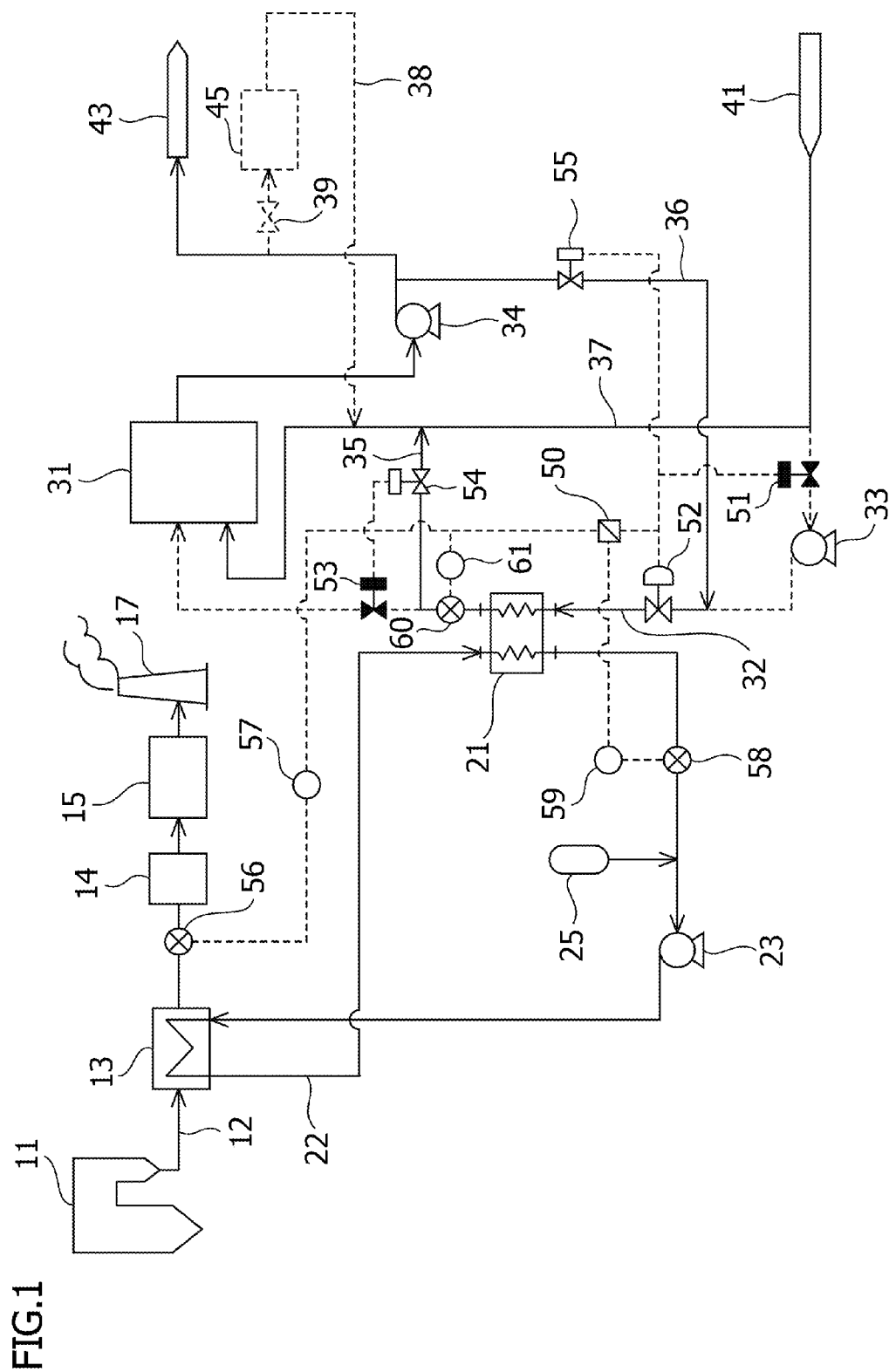
FIG. 1 is a schematic view illustrating an embodiment of a heat recovery and utilization system of the present invention for describing an operation thereof at the time of startup.

As shown in FIG. 1, the heat recovery and utilization system of the present embodiment includes a boiler 11 for electricity generation, a heat recovery unit 13 for recovery of heat from exhaust gas of this boiler, a dust collector unit 14 for removing smoke dust from exhaust gas after heat recovery, a desulfurization unit 15 for removing sulfur oxides from exhaust gas after removal of smoke dust, and a smokestack 17 for emitting exhaust gas into the atmosphere after desulfurization. An exhaust gas passage 12 in which boiler exhaust gas flows is provided in each section between the boiler 11, the heat recovery unit 13, the desulfurization unit 15, and the smokestack 17.

Although not shown, this system includes a steam turbine which is operated by steam from the boiler 11 and a power generator for generating electricity with driving power from the steam turbine. In addition, it may also include a condenser for condensation of exhaust gas from a steam turbine by cooling and a heater for heating this condensate water and supplying it to the boiler 11. The heater also may include a first heater for heating with low-pressure extracted steam from the steam turbine and a second heater for heating with high-pressure extracted steam from the steam turbine.

Although not shown, the exhaust gas passage 12 may include an air preheater for preheating air supplied to the boiler 11 by using exhaust gas as a heat source between the boiler 11 and the heat recovery unit 13. The dust collector unit 14 may be provided between the boiler 11 (air preheater if the air preheater is provided) and the heat recovery unit 13, different from that shown in the figure.

The heat recovery unit 13 contains a heat transfer pipe in which a heat medium flows within the passage of the boiler exhaust gas to recover heat from the boiler exhaust gas. To utilize recovered heat as a heat source for a local area heat supply facility, this system includes a heat exchanger 21 for exchanging heat between the aforementioned heat medium and supply water for the local area heat supply facility, a heat medium circulation pipe 22 in which heat medium circulates between the heat exchanger 21 and the heat recovery unit 13, and a supply water pipe 32 in which the supply water for the local area heat supply facility flows so as to pass through the heat exchanger 21.

The heat medium circulation pipe 22 is provided with a recirculation pump 23 for pressure-feeding heat medium and a heat medium tank 25 for supplying heat medium to this circulation pipe. The supply water pipe 32 contains a low temperature water pump 33 for pressure-feeding supply water (low temperature water 41) to the heat exchanger side, a heat accumulator 31 which stores supply water (high temperature water) heated by the heat exchanger 21 to accumulate heat, and a high temperature pump 34 for pressure-feeding high temperature water 43 from the heat accumulator 31 to a local area.

The heat accumulator 31 has a high temperature water inlet which is supplied with the aforementioned high temperature water for heat accumulation and a low temperature water inlet which is supplied with supply water whose temperature is lower than a predetermined temperature. The low temperature water inlet of this heat accumulator 31 is connected to a low temperature water bypass pipe 37 which feeds supply water (low temperature water 41) to the heat accumulator 31 without heating with the heat exchanger 21. Then, a startup drain pipe 35 which feeds supply water to the low temperature water bypass pipe 37 after passing the heat exchanger 21 is provided on the downstream side of the supply water pipe 32 with respect to the heat exchanger 21.

Additionally, a startup water supply pipe 36 which feeds high temperature water to the heat exchanger 21 is provided from the downstream side of the high temperature water pump 34 in the supply water pipe 32.

In the supply water pipe 32, a valve 51 which controls the amount of supply water (low temperature water) to the heat exchanger 21 is provided upstream of the low temperature water pump 33, a supply water amount adjusting valve 52 which controls the amount of the low temperature water 41 for the local area heat supply facility is provided between the low temperature water pump 33 and the heat exchanger 21, and a valve 53 which controls the amount of supply water to the high temperature water inlet of the heat accumulator 31 is provided between a connection point of the startup drain pipe 35 and the heat accumulator 31. The startup drain pipe 35 is provided with a valve 54 which controls supply of the supply water to the low temperature water inlet of the heat accumulator 31. The startup supply pipe 36 is provided with a valve 55 which controls supply of high temperature water from the heat exchanger 31 to the heat exchanger 21.

The exhaust gas passage 12 is provided with an exhaust gas thermometer 56 for measuring temperature of exhaust gas between the heat recovery unit 13 and the desulfurization unit 15, and a remote monitoring control unit 57 which monitors and controls temperature of the exhaust gas thermometer. The heat medium circulation pipe 22 is provided with a heat medium thermometer 58 which measures temperature of heat medium and a remote monitoring control unit 59 which monitors and controls temperature of the heat medium thermometer downward of the heat exchanger 21. The supply water pipe 32 is provided with a supply water thermometer 60 for measuring temperature of supply water (high temperature water) and a remote monitoring control unit 61 which monitors and controls temperature of the supply water thermometer downward of the heat exchanger 21. This system is connected to these remote monitoring control units communicably and includes a central monitoring control unit 50 which controls the amount of supply water of the startup supply water valve 52.

With such a configuration, at the time of startup of this system, first, as shown in FIG. 1, the valve 51 and the valve 53 are closed and then, the valve 54 and the valve 55 are opened so as to supply high temperature water having a temperature of 75 to 100° C. for example, stored in the heat accumulator 31 to the heat exchanger 21 with the high temperature pump 34. As a result, although heat medium contained in the heat medium circulation pipe 22 before startup has as low a temperature as 20 to 40° C., for example, the heat exchanger 21 is capable of heating it up to at least 70° C., preferably 70 to 90° C. to warm up the heat recovery unit 13.

Next, the boiler 11 is started and both a steam turbine (not shown) and a power generator (not shown) are driven with generated steam to generate power. At the same time, exhaust gas having a very high temperature is discharged into the exhaust gas passage 12. After passing through an air preheater (not shown) as required, boiler exhaust gas is introduced into the heat recovery unit 13 in such a condition that it has a temperature of 120 to 160° C., for example. The heat exchanger 13 exchanges heat with the heat medium heated up to a predetermined temperature and after the temperature of the heat medium is reduced to 80 to 110° C., the heat medium is introduced into the desulfurization unit 15. Then, the boiler exhaust gas after desulfurization is discharged into the atmosphere through the smokestack 17.

If the exhaust gas temperature decreases too extremely in the heat recovery unit 13 before it is introduced into the desulfurization unit 15, corrosive constituents (e.g., sulfur compounds such as sulfuric acid) in the exhaust gas reach a dew point, which may lead to a problem of corrosion in apparatuses and devices disposed downstream of the heat recovery unit 13. Thus, by heating the heat medium in the heat exchanger 21 preliminarily to warm up the heat recovery unit 13 up to a predetermined temperature, the temperature of boiler exhaust gas can be kept at the predetermined temperature. Although conventionally steam has been produced in a power plant so as to warm up the heat recovery unit 13, the present embodiment requires no steam and further no apparatus or device such as a heat exchanger, a drain collecting unit for warming heat medium in the heat recovery unit 13 with this steam is also unnecessary.

On the other hand, the temperature of high temperature water used in heating the heat medium in the heat exchanger 21 decreases to 30 to 50° C., for example. Thus, this water is introduced to the low temperature inlet of the heat accumulator 31 via the startup drain pipe 35 and the low temperature bypass pipe 37. High temperature water is supplied to the heat exchanger 21 from the heat accumulator 31 so as to warm up the heat recovery unit 13 in the above-described manner and at the same time, the high temperature water 43 may be supplied for heating and the like in a local area as a local heat supply facility. The low temperature water 41 used for heating and the like is collected to the low temperature inlet of the heat accumulator 31 via the low temperature bypass pipe 37.

Figure 2:
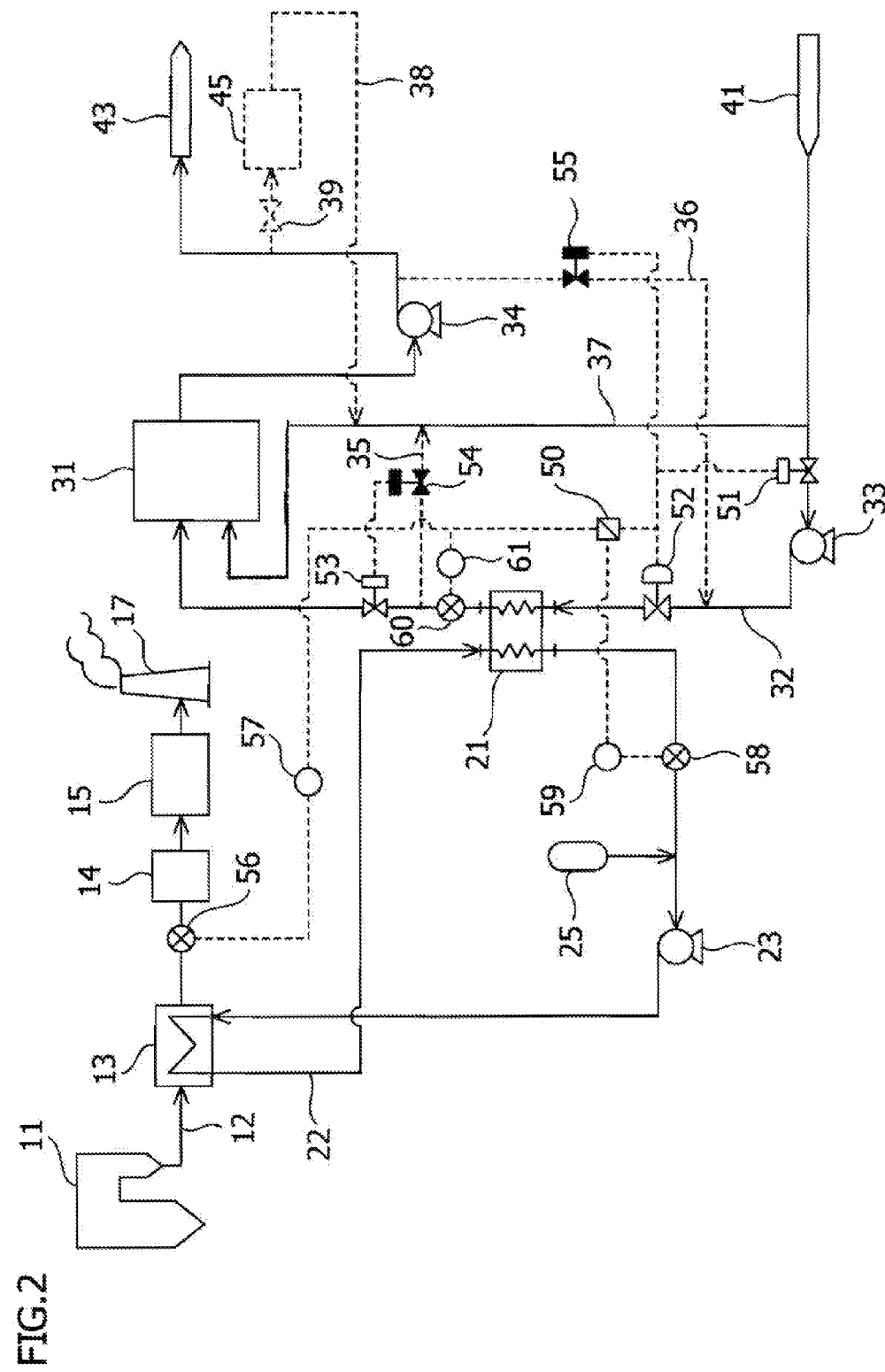
FIG. 2 is a schematic view illustrating an embodiment of a heat recovery and utilization system of the present invention for describing an operation thereof at the time of ordinary operation.

After the warm-up of the heat recovery unit 13 is completed, this system is operated normally. As shown in FIG. 2, the valve 51 and the valve 53 are opened, and then, the valve 54 and the valve 55 are closed so as to introduce part of the low temperature water 41 having a temperature of 30 to 50° C., for example, as supply water for local area heat supply facility, to the heat exchanger 21 with the low temperature water pump 33. The heat medium which is introduced to the heat exchanger 21 upon normal operation is heated up to 100 to 120° C., for example, with the boiler exhaust gas in the heat recovery unit 13s. Thus, the heat exchanger 21 is capable of heating the low temperature water 41 having such a high temperature up to 75 to 100° C., for example. The heated supply water is introduced to the high temperature inlet of the heat accumulator 31.

The heated supply water is supplied to a local area as the high temperature water 43 for heating and the like from the heat accumulator 31 by means of the high temperature pump 34 via the supply water pipe 32. Although the heat medium which has heated the low temperature water 41 in the heat exchanger 21 decreases to 70 to 90° C., for example, it is reintroduced to the heat recovery unit 13 via the heat medium circulation pipe 22 and heated up to a predetermined temperature.

Because the heat medium is reduced or deteriorated due to cyclic use, fresh heat medium can be supplied to the heat medium circulation pipe 22 from the heat medium tank 25. Although the heat medium is not restricted to any particular one, it is preferable to use boiler supply water or pure water (deionized water) containing deoxidant.

Upon normal operation also, it is preferable to keep the temperature of the heat medium downward of the heat exchanger 21 in the heat medium calculation pipe 22 at 70° or more, for example. Thus, the temperature of the heat medium is measured and monitored by the heat medium thermometer 58 and the remote monitoring control unit 59, and the central monitoring control unit 50 controls the supply water amount adjusting valve 52 so as to control the amount of the low temperature water 41 supplied to the heat exchanger 21. That is, if a temperature measured by the heat medium thermometer 58 is lower than the predetermined temperature, a flow rate of the low temperature water 41 is decreased with the supply water amount adjusting valve 52 to decrease the heat exchange amount in the heat exchanger 21, thereby keeping the temperature of the heat medium at a predetermined temperature.

This supply water adjusting valve 52 is usable even upon startup operation. In correspondence with an increase in the temperature of the heat medium measured by the heat medium thermometer 58 from a low temperature up to a predetermined temperature, the flow rate of the high temperature water supplied to the heat exchanger 21 can be controlled with the supply water adjusting valve 52. As a result, the high temperature water stored in the heat accumulator 31 is efficiently usable.

In addition, preferably, the temperature of boiler exhaust gas downward of the heat recovery unit 13 in the exhaust gas passage 12 is kept at 80° C. or more, for example. Thus, the temperature of exhaust gas downward of the heat recovery unit 13 is measured and monitored by the exhaust gas thermometer 56 and the remote monitoring control unit 57 located there. If a temperature measured by the exhaust gas thermometer 56 is lower than the predetermined temperature, the supply water amount adjusting valve 52 is controlled by the central monitoring control unit 50 so as to decrease the flow rate of the low temperature water 41 supplied to the heat exchanger 21. Consequently, the heat exchange amount in the heat exchanger 21 is decreased, thereby keeping the temperature of the boiler exhaust gas at a predetermined temperature.

In the present embodiment, temperature control of the boiler exhaust gas downward of the heat recovery unit 13 is performed by flow rate control of the low temperature water 41 in the heat exchanger 21. Thus, no bypass pipe for the heat medium or control valve for the bypass flow rate, provided conventionally within the heat medium circulation pipe, is required.

According to the present invention, as shown in FIGS. 1 and 2, as well as the above-described local area heat supply facility, a dryer 45 may be provided downward of the high temperature pump 34 in the supply water pipe 32. The dryer 45 is an apparatus which dries biomass such as thinnings, chips, chaff, pulp, raw garbage, and sludge. The dryer 45 is provided with a dryer drain pipe 38 which brings back supply water discharged from the dryer 45 to the low temperature inlet of the heat accumulator 31 and a valve 39 which controls supply of the high temperature water to the dryer 45.

With this configuration, high temperature water having a predetermined temperature is supplied to the dryer 45 as well as local area, where it can be used as a heat source for drying biomass generated there. Although the drawings show a case in which both the local area heat supply facility and the dryer are provided, the present invention may be applied to a case in which only the dryer is provided.

EXAMPLE

Heat balance was simulated using a system illustrated in FIGS. 1 and 2. The temperature of boiler exhaust gas when it was introduced into the heat recovery unit 13 was set to 130° C., the temperature of heat medium in the heat medium circulation pipe 22 was initially set to 35° C., the temperature of the low temperature water 41 for a local area heat supply facility was set to 40° C., and the temperature of high temperature water stored in the heat accumulator 31 was initially set to 85° C. Then, the flow rate of the boiler exhaust gas was set to 1,200,000 Nm³/h, the flow rate of heat medium in the heat medium circulation pipe 22 was set to 510 m³/h, and the volume of high temperature water stored in the heat accumulator 31 was set to 100 m³.

Upon startup of the system, high temperature water from the heat accumulator 31 was used. As a result, heat medium having a temperature of 70° C. could be supplied to the heat recovery unit 13. Next, the system was changed to normal operation. To keep the temperature of boiler exhaust gas downward of the heat recovery unit 13 at 85° C., heat medium having a temperature of 75° C. was supplied to the heat recovery unit 13. As a result, the heat medium was heated to 110° C. by way of heat exchange with boiler exhaust gas. By introducing heat medium having a temperature of 110° C. to the heat exchanger 21, low temperature water whose flow rate was 400 m³/h and having a temperature of 40° C. could be heated up to 85° C. which was sufficient as the high temperature water for a local area heat supply facility.

DESCRIPTION OF REFERENCE NUMERALS

11: boiler
13: heat recovery unit
14: dust collector
15: desulfurization unit
17: smokestack
21: heat exchanger
22: heat medium circulation pipe
23: recirculation pump
25: heat medium tank
31: heat accumulator
32: supply water pipe
33: low temperature pump
34: high temperature pump
35: startup drain pipe
36: startup supply pipe
37: low temperature water bypass pipe
38: dryer drain pipe
39: valve
41: low temperature water
43: high temperature water
45: dryer
50: central monitoring control unit
51, 53, 54, 55: valve
52: supply water adjusting valve
56: exhaust gas thermometer
57, 59, 61: remote monitoring control unit
58: heat medium thermometer
60: supply water thermometer

The invention claimed is:

1. A heat recovery and utilization system comprising:
a boiler for electricity generation;
a heat recovery unit for recovering heat from exhaust gas of the boiler by heat exchanging between the exhaust gas and a heat medium;
a heat exchanger for heat exchanging between the heat medium and supply water;
a heat accumulator for storing the supply water heated by the heat exchanger to accumulate heat for equipment other than equipment for electricity generation;
a heat medium circulation line for circulating the heat medium between the heat recovery unit and the heat exchanger;
a supply water pipe for feeding the supply water to the heat accumulator after the supply water is passed through the heat exchanger;
a first water pump for pressure-feeding supply water to the heat exchanger, in which the supply water is heated by the heat medium and then is fed to the heat accumulator, the first water pump being disposed on the supply water pipe upstream of the heat exchanger; and
a second water pump for pressure-feeding the heated supply water from the heat accumulator to the heat exchanger through a startup water supply pipe, which is connected to the supply water pipe at a position between the heat exchanger and the first water pump,
wherein the heated supply water stored in the heat accumulator is supplied to the heat exchanger through the startup water supply pipe, such that the heat exchanger heats the heat medium circulating in the heat medium circulation line and preheats the heat recovery unit at a time of startup of the system.

2. The heat recovery and utilization system according to claim 1, wherein the equipment other than equipment for electricity generation is a local area heat supply facility and the supply water stored in the accumulator is supplied to a local area.

3. The heat recovery and utilization system according to claim 1, wherein the equipment other than equipment for electricity generation is biomass drying equipment and the supply water stored in the accumulator is supplied to the biomass drying equipment as a heat source for drying biomass.

4. The heat recovery and utilization system according to claim 1, further comprising a control unit for controlling a heat exchange amount with heat recovered by the heat recovery unit as heat source for the equipment other than equipment for electricity generation based on temperature of boiler exhaust gas after heat recovery by the heat recovery unit.

5. The heat recovery and utilization system according to claim 1, wherein the heat accumulator has a first water inlet that is supplied with supply water having a temperature equal to or higher than a predetermined temperature and a second water inlet that is supplied with supply water having a temperature that is lower than the predetermined temperature, wherein the second water inlet is connected to a water bypass pipe for feeding supply water to the heat accumulator that does not pass through the heat exchanger, wherein the water bypass pipe is connected to the supply water pipe upstream of the first water pump, wherein the first water inlet is connected to the supply water pipe, wherein the system further comprises a startup drain pipe for feeding supply water that passes through the heat exchanger from the supply water pipe to the water bypass pipe, and wherein the startup drain pipe is connected to the supply water pipe at a position between the heat exchanger and the heat accumulator.

6. The heat recovery and utilization system according to claim 1, further comprising:
a supply water amount adjusting valve in the supply water pipe for controlling an amount of the supply water supplied to the heat exchanger;
a heat medium thermometer in the heat medium circulation pipe for measuring a temperature of the heat medium downstream of the heat exchanger;
a first remote monitoring control unit for monitoring the temperature measured by the heat medium thermometer; and a central monitoring control unit communicably connected to the first remote monitoring control unit and to the supply water amount adjusting valve to control the amount of the supply water supplied to the heat exchanger.

7. The heat recovery and utilization system according to claim 6, further comprising:
an exhaust gas thermometer for measuring a temperature of the exhaust gas between the heat recovery unit and a desulfurization unit; and
a second remote monitoring control unit for monitoring the temperature measured by the exhaust gas thermometer, the central monitoring control unit being communicably connected to the second remote monitoring control unit.

8. The heat recovery and utilization system according to claim 7, further comprising:
a supply water thermometer in the supply water pipe for measuring a temperature of the supply water downstream of the heat exchanger; and
a third remote monitoring control unit for monitoring the temperature measured by the supply water thermometer, the central monitoring control unit being communicably connected to the third remote monitoring control unit.

* * * * *